(12) United States Patent
Jeerage et al.

(10) Patent No.: US 7,212,921 B2
(45) Date of Patent: May 1, 2007

(54) SYSTEM AND METHOD FOR MULTIPLEXING AND TRANSMITTING DC POWER, IMU DATA AND RF DATA ON A SINGLE CABLE

(75) Inventors: Mahesh K. Jeerage, New Brighton, MN (US); Charles T. Bye, Eden Prairie, MN (US); Wayne A. Soehren, Wayzata, MN (US)

(73) Assignee: Honeywell International Inc., Morristown, NJ (US)

( * ) Notice: Subject to any disclaimer, the term of this patent is extended or adjusted under 35 U.S.C. 154(b) by 246 days.

(21) Appl. No.: 10/812,172

(22) Filed: Mar. 30, 2004

(65) Prior Publication Data
US 2004/0236509 A1    Nov. 25, 2004

Related U.S. Application Data

(60) Provisional application No. 60/472,120, filed on May 21, 2003.

(51) Int. Cl.
*G01S 1/00* (2006.01)
(52) U.S. Cl. ............ 701/214; 342/357.14; 342/357.06; 307/22
(58) Field of Classification Search ................ 701/214, 701/216, 220, 213; 348/116; 307/23, 22, 307/26; 342/357.06, 357.14, 357.08, 357.12, 342/422, 108, 109
See application file for complete search history.

(56) References Cited

U.S. PATENT DOCUMENTS

| | | | | |
|---|---|---|---|---|
| 5,166,789 A | * | 11/1992 | Myrick | 348/144 |
| 5,490,075 A | * | 2/1996 | Howard et al. | 701/226 |
| 5,519,620 A | * | 5/1996 | Talbot et al. | 701/214 |
| 5,787,384 A | * | 7/1998 | Johnson | 701/216 |
| 5,894,323 A | * | 4/1999 | Kain et al. | 348/116 |
| 6,037,893 A | * | 3/2000 | Lipman | 342/25 F |
| 6,278,945 B1 | * | 8/2001 | Lin | 701/216 |
| 6,563,801 B2 | | 5/2003 | Makinen et al. | |
| 2001/0020216 A1 | * | 9/2001 | Lin | 701/216 |
| 2002/0062193 A1 | * | 5/2002 | Lin | 701/208 |
| 2004/0012522 A1 | * | 1/2004 | Groves | 342/357.14 |

FOREIGN PATENT DOCUMENTS

| | | |
|---|---|---|
| DE | 101 33 658 A1 | 6/2003 |
| EP | 0 820 158 A1 | 2/1988 |

* cited by examiner

*Primary Examiner*—Tuan C To
(74) *Attorney, Agent, or Firm*—J. Patrick Kendrick; Fogg & Powers LLC

(57) ABSTRACT

A system for providing connectivity to co-located instruments includes a processor for receiving and processing GPS data and IMU data, a GPS receiver antenna operable to supply the GPS data to the processor, and an IMU, co-located with the GPS receiver antenna, operable to provide the IMU data to the processor. A single cable is provided between the processor and co-located equipment and, by using filtering mechanisms, the single cable is operable to simultaneously supply DC power to the IMU and to transmit the GPS data and the IMU data to the processor.

20 Claims, 1 Drawing Sheet

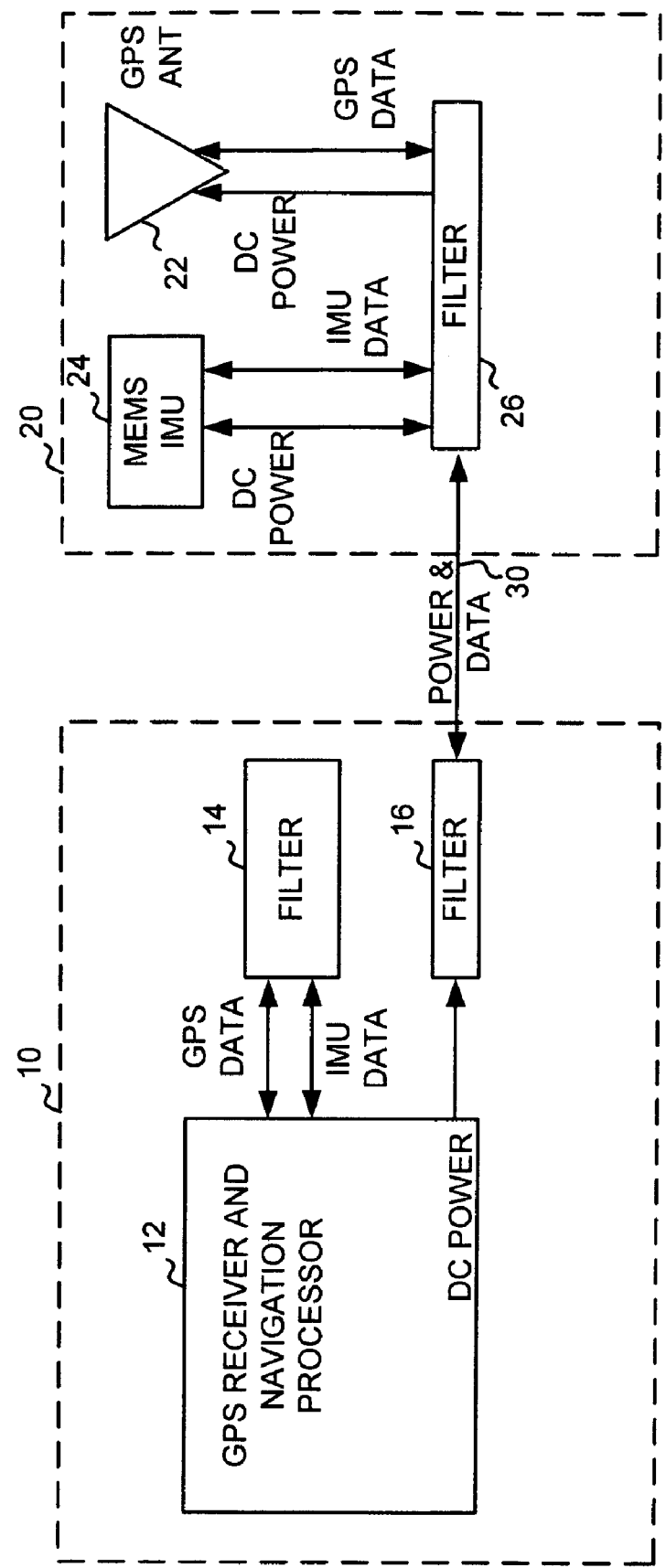

SYSTEM AND METHOD FOR MULTIPLEXING AND TRANSMITTING DC POWER, IMU DATA AND RF DATA ON A SINGLE CABLE

This application claims the benefit of U.S. Provisional Application No. 60/472,120, filed May 21, 2003, which is herein incorporated by reference in its entirety.

BACKGROUND

1. Field of the Invention

The present invention relates to systems and methods used for enhancing navigation performance. More particularly, the present invention relates to interconnecting and co-locating different systems and components with little impact on existing cabling requirements between and among the systems and components.

2. Background of the Invention

As a result of component miniaturization, it is becoming increasingly possible to co-locate instruments for the benefit of confirming or refining measurement data obtained by either or both instruments. Examples of such instruments might include a global positioning satellite (GPS), Galileo, or GPS/Galileo antenna and an inertial measurement unit (IMU) that are fixed to a wing of an aircraft. Of course, transmission of data and power to and from such co-located units requires multiple cables. However, the use of multiple cables often results in complex wire routing and inefficient use of resources, especially on aircraft having limited space. In addition, routing individual cables for each of these tasks increases weight for a given installation. It would be desirable to have a simpler and more efficient manner of transmitting power and data with respect to co-located devices, especially devices associated with aircraft navigation.

SUMMARY OF THE INVENTION

The present invention provides a system that includes processor(s) for receiving, transmitting, and processing GPS (or Galileo, or like RF signal) data and IMU data, a GPS (or Galileo, or similar) receiver antenna operable to supply the appropriate RF data to the processor(s), and an IMU, co-located with the GPS receiver antenna, operable to provide the IMU data to the processor(s). The IMU may contain Micro-ElectroMechanical System (MEMS) gyros and accelerometers, but the present invention should not be construed to be limited to IMUs containing MEMS sensors. In a preferred embodiment, a single cable is provided that is operable to simultaneously supply DC power to the IMU and GPS antenna and to transmit and receive the GPS data and the IMU data by the processor. The IMU outputs status data, and data derived from gyros and accelerometers. The IMU may also be an inertial navigation system (INS). In the case where it is an INS, it will output additional information which may include position, velocity, and attitude information.

According to one implementation of the invention, the system comprises a combination power and data cable in communication, via a filter, with a MEMS IMU and a GPS receiver antenna. The GPS receiver antenna may be an integral GPS antenna and preamplifier or a separate GPS antenna and preamplifier. In the case of the separate preamplifier, the data from the preamplifier is supplied to the filter and the GPS antenna data is supplied to the preamplifier. The filter is operable to pass DC power from the combination power and data cable to the MEMS IMU and to preclude DC power from reaching the GPS receiver antenna, unless a preamplifier is integrated therewith. The filter may further be operable to pass IMU data generated by the IMU and received GPS radio frequency energy to the combination power and data cable. In addition, the combination power/data cable may be in communication with a processor operable to process the IMU data and GPS radio frequency energy. The IMU data may or may not be remodulated before being added to the transmission medium containing the GPS RF signal. The transmission medium may be, for example wire or fiber optical cable.

According to another aspect of the invention, the system comprises a first subsystem, a second subsystem, and a single cable connecting the first subsystem and the second subsystem. The first subsystem comprises a processor for processing both GPS data and IMU data, a first filter for passing DC power, and a second filter for allowing GPS radio frequency energy and IMU data to pass. The second subsystem comprises an IMU, a GPS receiver antenna with optional pre-amp, and a third filter for passing DC power to the IMU and for allowing GPS radio frequency energy from the GPS receiver antenna and MEMS IMU data to pass onto the single cable. The system may also allow for commands sent from the first subsystem to the GPS antenna to command any GPS associated electronics for the purpose of interference rejection, managing a controlled reception pattern antenna, or improvement in anti-jam performance.

While the present invention is explained with respect to a GPS and IMU implementation, the invention is not limited to systems containing only GPS and IMUs, but can be applied to other sensors that output data in the RF domain and to which the IMU is added.

These and other features of the present invention and their attendant advantages will be more fully appreciated upon a reading of the following detailed description in conjunction with the associated drawing.

BRIEF DESCRIPTION OF THE DRAWING

The single FIGURE is a schematic diagram of an exemplary embodiment of the present invention.

DESCRIPTION OF THE INVENTION

The present invention has been developed in connection with improving navigation performance. Recently, inertial measurement units (IMUs) based on micro electromechanical systems (MEMS) technology have been developed. Such MEMS IMUs comprise gyroscopic and accelerometer components that are becoming increasingly sensitive. Also, the Global Positioning System (GPS) has been increasingly used to augment, or in many cases, completely replace conventional navigation tools and components. The present invention enables an enhanced navigation system that uses the features of both a MEMS IMU and GPS without requiring significant reworking of cabling.

In particular, it has been determined that significant navigational performance enhancements can be obtained when a MEMS IMU is co-located with a GPS receiver antenna. These two devices could be located together, for example, on a wing of an aircraft to sense the fluctuations, bending, vibration, etc., of the wing with respect to the aircraft fuselage. This data can then be used to detect accurately, and compensate for, the motion of the GPS or any other like antenna.

In the aircraft industry, it is typically undesirable to route new cabling through existing structural components.

Accordingly, the present invention provides for system co-location with minimal cabling requirements.

The FIGURE illustrates an exemplary implementation of the present invention. As shown, the present invention addresses cabling issues by utilizing a single cable to transmit GPS RF data, IMU data and DC power. The present invention preferably leverages frequency separation and modulation techniques to combine, transmit and separate the several "signals" sharing the same cable. At a high level, the present invention operates to modulate IMU data by a carrier whose center frequency is much lower compared to GPS frequencies (e.g., L1/L2) to avoid interference with the GPS RF data. The IMU data is extracted at the receiving end by band-pass filtering and signal processing. In a similar fashion, the DC power is extracted near the MEMS IMU by low-pass filtering.

Referring still to the FIGURE, a first portion 10 is connected to a second portion 20 via a common power and data cable 30. First portion 10 preferably includes a processor 12 that processes both GPS data and MEMS IMU data, and would typically be located (in an aircraft implementation) in the fuselage of an aircraft, along with other navigation equipment. Filters 14 and 16 are preferably integrated with, or located close to, processor 12. Processor 12, or a separate power supply (not shown), energizes power and data cable 30 with DC power.

Power and data cable 30 spans a predetermined distance (e.g. through an interior part of a wing) to second portion 20, which preferably comprises a GPS (or similar) antenna 22, a co-located MEMS IMU 24 and at least one filter 26.

In operation, DC power is provided to power and data cable 30. Filters 14, 16 and 26 are preferably arranged such that DC power is provided only to MEMS IMU 24. However, in the case where antenna 22 includes an integrated preamplifier, then filter 26 preferably also provides power to antenna 22. MEMS IMU data is preferably modulated on to a carrier signal that can be easily separated from the received GPS signals, e.g., L1 and L2 (1575 MHz and 1227 MHz, respectively). Thus, as shown, while DC power is being provided to MEMS IMU 24, data from both MEMS IMU 24 and GPS antenna 22 is being simultaneously transmitted across the same cable and received at processor 12. By selecting the appropriate filtering frequencies and demodulating techniques, processor 12 can thus receive discernable GPS RF data (e.g., L1/L2) and IMU data over the same cable that powers the IMU itself.

Thus, in accordance with the present invention, only one coaxial cable, namely power and data cable 30, is necessary to interconnect first and second portions 10 and 20 to enable co-location of a GPS antenna and a MEMS IMU. Of course, other types of cable may also be used. Consequently, enhanced navigation and data information can be easily obtained without significantly impacting cabling requirements.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for enhancing navigation, comprising:
   a processor for receiving and processing radio frequency (RF) position data, inertial measurement unit (IMU), and Inertial Navigation System (INS) data;
   a receiver antenna operable to supply the RF position data to the processor;
   an IMU, co-located with the receiver antenna, operable to provide the IMU data to the processor; and
   a single coaxial cable connected between a first subsystem comprising the processor and a second subsystem comprising the receiver antenna and IMU, the single coaxial cable simultaneously supplying direct current (DC) power to the IMU and transmitting the RF position data and the IMU data to the processor.

2. The system of claim 1, wherein the RF position data is global position satellite data.

3. The system of claim 1, wherein the RF position data is Galileo data.

4. The system of claim 1, wherein the IMU is a micro electromechanical systems (MEMS) IMU.

5. The system of claim 1, further comprising at least one filter configured to direct the DC power to the IMU but not to the receiver antenna.

6. The system of claim 1, further comprising at least one filter configured to distinguish between the RF position data and the IMU data.

7. The system of claim 1, wherein the system is mounted on an aircraft.

8. The system of claim 1, wherein the single coaxial cable passes through an interior portion of a wing of an aircraft.

9. An enhanced navigation system for powering and receiving data from remote equipment, comprising:
   a combination power and data cable in communication, via a filter, with a MEMS IMU and a GPS receiver antenna;
   the filter configured to pass DC power from the combination power and data cable to the MEMS IMU and to preclude DC power from reaching the GPS receiver antenna;
   the filter further configured to pass IMU data generated by the MEMS IMU and received GPS radio frequency energy to the combination power and data cable; and wherein
   the power and data cable is in communication with a processor configured to process the IMU data and GPS radio frequency energy.

10. The system of claim 9, wherein the MEMS IMU and GPS receiver antenna are co-located.

11. They system of claim 10, wherein the MEMS IMU and GPS receiver antenna are mounted on a wing of an aircraft.

12. The system of claim 9, further comprising an aircraft inertial navigation system in communication with the processor.

13. The system of claim 9, wherein the filter is co-located with the MEMS IMU and GPS receiver antenna.

14. The system of claim 9, further comprising at least another filter configured to distinguish between the IMU data and the received GPS radio frequency energy.

15. The system of claim 14, wherein the processor is in communication with the at least another filter and receives the IMU data and the received GPS radio frequency energy via the at least another other filter.

16. A system, for enhancing navigation comprising:
 a first subsystem;
 a second subsystem; and
 a single coaxial cable spanning a distance between the first subsystem and the second subsystem;
 the first subsystem, comprising:
  a processor for processing both GPS data and MEMS IMU data;
  a first filter configured to pass DC power to the single coaxial cable; and
  a second filter configured to process GPS radio frequency energy and IMU data received from the single coaxial cable;
 the second subsystem, comprising:
  a MEMS IMU;
  a GPS receiver antenna; and
  and a third filter configured to send DC power from the single coaxial cable to the MEMS IMU and to send MEMS IMU data and GPS radio frequency energy to the processor through the single coaxial cable.

17. The system of claim 16, wherein the first subsystem further comprises an aircraft inertial navigation system.

18. The system of claim 16, wherein the second subsystem is located on an aircraft wing.

19. The system of claim 16, wherein the GPS receiver antenna and the MEMS IMU are co-located.

20. The system of claim 16, wherein the third filter is further configured to preclude DC power from reaching the GPS receiver antenna.

* * * * *